United States Patent [19]

Roca et al.

[11] Patent Number: 4,681,634
[45] Date of Patent: Jul. 21, 1987

[54] COMPOSITION CIMENTAIRE HYDRAULIQUE A PRISE RETARDEE POUR CIMENTATION A HAUTES TEMPERATURE ET PRESSION

[75] Inventors: Yves Roca, Leblanc Mesnil; Jacky Rousset, St. Trivier-Sur-Moignens; Pierre Bouchut, Decines; Marie-Christine Leblanc, Boulogne; Daniel Baffreau, Lavarenne St Hilaire, all of France

[73] Assignees: Coatex S.A., Caluire; Total Compagnie Francaise des Petroles S.A., Paris, both of France

[21] Appl. No.: 787,902

[22] Filed: Oct. 16, 1985

[30] Foreign Application Priority Data

Oct. 16, 1984 [FR] France ................. 84 16004

[51] Int. Cl.$^4$ ................. C04B 7/02; C04B 24/00
[52] U.S. Cl. ................. 106/90; 106/314; 106/315
[58] Field of Search ................. 106/90, 314, 315

[56] References Cited

U.S. PATENT DOCUMENTS

| 2,848,340 | 8/1958 | Haldas | 106/315 |
| 3,856,541 | 12/1974 | Martin | 106/315 |
| 4,054,460 | 10/1977 | Buchet et al. | 106/97 |
| 4,059,552 | 11/1977 | Zweigle et al. | 260/29.6 TA |
| 4,500,357 | 2/1985 | Brothers et al. | 106/90 |

FOREIGN PATENT DOCUMENTS

| 970398 | 7/1975 | Canada . | |
| 1471153 | 3/1969 | Fed. Rep. of Germany | 106/314 |
| 2031397 | 7/1978 | United Kingdom . | |

Primary Examiner—William R. Dixon, Jr.
Assistant Examiner—A. Knab
Attorney, Agent, or Firm—Oblon, Fisher, Spivak, McClelland & Maier

[57] ABSTRACT

Hydraulic cement composition with delayed setting, intended to be employed in an environment which may be under extreme temperature, pressure and salinity conditions, the composition being characterized in that it incorporates
(a) a saline or nonsaline aqueous liquid phase,
(b) at least one hydraulic cement,
(c) a setting-retarder adjuvant preserving and/or improving the rheological properties, a water-soluble copolymer resulting from the copolymerization of ethylenic acids, acrylamides and ethylenic esters of phosphoric acid.

16 Claims, No Drawings

COMPOSITION CIMENTAIRE HYDRAULIQUE A PRISE RETARDEE POUR CIMENTATION A HAUTES TEMPERATURE ET PRESSION

The invention relates to a hydraulic cement composition with retarded setting, intended to be used in an environment which may, if appropriate, be under extreme conditions of temperature, pressure and salinity.

DISCUSSION OF THE BACKGROUND

Hydraulic cement compositions have, for a long time now, frequently been employed in the construction of buildings, in civil engineering work such as structures (bridges, dams, roads, motorways, tunnels, reservoirs, etc.), but also in geological excavations, such as, for example, oil wells, water wells or any other type of well, for cementing casings, and liners, for the production of cement plugs and for injection under pressure. In in many cases, it can happen that the environment to be cemented is at a higher temperature than the usual application temperature, with the result that the time required for normal setting of the cement is greatly reduced, thus exhibiting an increase in the rate of setting of the cement, which is awkward for the specialist. Under these conditions, it becomes difficult to use a hydraulic cement the physical state of which undergoes an unfavourable change with the thermal state of the environment to be cemented. In fact, this problem of controlling the setting of hydraulic cements, when they are employed in media at a temperature which is higher than normal (accelerating the setting rate), has not yet been fully solved.

In the particular case of oil prospecting, this problem is even more acute because in drilling for oil the cementing operation is carried out by injecting the hydraulic cement composition, according to techniques which are well known to the expert, in order to place this composition in contact with the walls to be cemented. Now, in boreholes the temperature increases with the depth and, consequently, conventional cements cannot be employed on their own because when they are subjected to this temperature rise, their setting is accelerated too much for the placing of the cement to be carried out correctly. This is why their setting must be delayed so that the upward transfer may take place without an increase in viscosity, that the annulus may be cemented over the entire depth of the borehole and that these walls may be leakproof after the cementing.

Another problem which is added to this problem of acceleration of cement setting due to a rise in the temperature of the environment, is that of anticipating and bringing under control the behaviour of the hydraulic cement composition as it passes through diverse geological formations. The initial rheological properties of the said composition, together with other physical properties, may be affected by the mineral materials forming the layers through which it passes, such as saline layers, or by the inflow of water, particularly brines.

Furthermore, the development of offshore oil prospecting renders this problem more difficult because the cement compositions employed must be capable of being prepared with the use of brine (seawater).

For the expert, known cement compositions consist firstly of a hydraulic cement, such as, for example, a Portland cement, an alumina cement, and then freshwater or seawater or saturated brine and at least one adjuvant enabling some properties of the cement compositions employed to be controlled, if possible, without these properties being modified by the difficult temperature and pressure conditions prevailing at the bottom of the well.

Among these properties which the specialist considers to be essential, the hydraulic cement composition must retain for several hours its pumpability, offer good rheological properties, prevent the loss of liquid by filtration through porous formations and, lastly, have good compressive strength.

This is why many chemical adjuvants have so far been suggested and described in specialist literature, to try to provide a solution to the abovementioned problems or phenomena.

A first type of adjuvant, which is a setting retarder for a hydraulic cement composition (Portland cement) is recommended in U.S. Pat. No. 4,054,460. This adjuvant consists mostly of $CaF_2$ and of smaller amounts of $Ca_3(PO_4)_2$, $CaSo_4$, $SiO_2$, $Fe_2O_3$ and $Al_2O_3$. While an adjuvant such as this appears to fulfil the function of a setting retarder in environments subject to ambient temperature of the order of 20° C. and 35° C. it is found to be ineffective when the temperature "in situ" attains high levels, such as for example 150° C., at the bottom of a borehole.

Another type of a setting-retarder adjuvant for a hydraulic cement composition at a high temperature (not exceeding 400° F., that is to say not exceeding 204° C.) is described in Canadian Pat. No. 970,398. This adjuvant is found to be a synergistic combination of lignosulphonic acids (or of a water-soluble salt) and boric acid (or of a water-soluble salt). However, while such a combination provides this function of retarding cement setting at a temperature as high as 204° C. (400° F.) because boric acid reinforces the widely known setting-retardant effect of lignosulphonic acid, it has major disadvantages, one of which relates to its utilization exclusively in a freshwater environment, another is that the setting-retardant effect is produced by two chemical compounds which must be strictly adjusted relative to each other for each cement composition, and that, finally, one of the greatest of these is their contaminating nature with regard to the environment in the case of chromium lignosulfonates or iron chromium ligno-sulfonates.

In a manner which is closely related to the adjuvant described in the abovementioned Canadian patent, U.S. Pat. No. 3,856,541 proposes as a setting retarder for a hydraulic cement composition subjected to a relatively high temperature (193° C.) another synergistic combination comprising a boron compound in a salt form, for example, and a hydroxycarboxylic acid such as tartaric acid, citric acid, gluconic acid or glucoheptonic acid, this synergistic combination having substantially the same disadvantages as those already mentioned in respect of the Canadian patent, that is to say that such a setting-retardant (and nonplasticizing) combination can be employed only in a freshwater environment and that this effect is produced by a mixture of two compounds, the boron compound reinforcing the hydroxycarboxylic acid, which would substantially lose its retardant effect if it was on its own when the said cement composition was employed in environments at a high temperature.

A latest type of setting-retarder adjuvant for a hydraulic cement composition is described in British Pat. No. 2,031,397. This adjuvant consists of polymers of a molecular weight of between 50,000 and 500,000, comprising anionic structures (acrylic and methacrylic acids) and nonionic structures (acrylamide, methacrylamide). However, the behaviour of this adjuvant as a setting retarder for cement does not appear to have been verified beyond a temperature threshold of 60° C., a temperature level which is too low in the case of the cementation of oil boreholes. And, furthermore, these acrylic acid derivatives are generally better known as thickening agents, for example in drilling fluids; a product of the acrylamide/sodium acrylate or substituent type is described as a thickening agent in U.S. Pat. No. 4,059,552.

Finally, as U.S. Pat. No. 3,952,805 teaches, it is recommended to use a copolymer of maleic anhydride and styrenesulphonic acid as a plasticizing agent for a hydraulic cement composition, even in a saline aqueous environment. However, such a composition does not appear to provide any retardant effect whatever in respect of these cement compositions.

Thus, the prior art offers the specialist solutions which cannot fully satisfy him because the recommended chemical adjuvants are frequently disappointing in their use, because their effect is weakened either by the presence of interfering inorganic compounds such as, for example, sodium chloride, etc., or owing to the temperature change phenomenon such as that which occurs at the bottom of oil boreholes, or else because these adjuvants become inefficient or are inhibited when they are introduced into a hydraulic cement suspension in which the aqueous phase is saline, or, finally, because these adjuvants can be of an environmentally polluting nature.

SUMMARY OF THE INVENTION

This is why the inventors, continuing their research, have now found and developed a nonpolluting hydraulic cement composition with delayed setting, which is intended to be employed efficaciously in an environment which may be under extreme temperature, pressure and salinity conditions, which is a new combination of known or unknown means.

The hydraulic cement composition with delayed setting according to the invention, which is intended to be employed even under extreme temperature, pressure and salinity conditions, is characterised in that it comprises:
(a) a saline or nonsaline aqueous liquid phase,
(b) at least one hydraulic cement,
(c) a setting-retarder adjuvant preserving and/or improving rheological properties, a water-soluble terpolymer resulting from the copolymerization of ethylenic acids, acrylamides, and ethylenic esters of phosphoric acid.

DETAILED DESCRIPTION OF THE PREFERRED EMBODIMENTS

A saline or nonsaline aqueous liquid phase means all waters, be they fresh, sea or salty, even saturated, water such as can be found at drilling sites.

A hydraulic cement denotes all the cements of known type, which comprise compounds of calcium, aluminium, silicon, oxygen and/or sulphur, which set solid and harden in the presence of water. Cements of this type are common Portland cements, fast-setting or extra-fast-setting, sulphate-resistant cements, modified cements, alumina cements, high-alumina cements, calcium aluminate cements, cements containing secondary components such as fly ash, pozzolana etc.

The setting-retarder adjuvant preserving and/or improving the rheological properties, even under extreme conditions of temperature, salinity and pressure prevailing in boreholes of great depth, is a water-soluble terpolymer resulting from the copolymerization of:
ethylenic acids containing the unit:
$CH_2=CR_1—COOH$
acrylamides containing the unit:
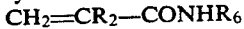
$CH_2=CR_2—CONHR_6$
and ethylenic esters of phosphoric acid, containing the unit: $CH_2=CR_4COOR_3OPO_3H_2$ The radicals $R_1$, $R_2$ and $R_4$ may be chosen from the group consisting of H and the alkyls, while the radical $R_3$ is either an alkylene, or an alkylene oxide and/or polyalkylene oxide or, finally, a combination of alkylene and an alkylene oxide and/or polyalkylene oxide and the radical $R_6$ may be chosen from the group consisting of hydrogen, alkyls, and alkylsulphonic acids.

Preferably, the radicals $R_1$, $R_2$, and $R_4$ are chosen from the group consisting of hydrogen and alkyls ranging from $C_1$ to $C_{18}$, while the radical $R_3$ is either an alkylene containing the unit $(—CH_2)_q$ in which q may assume values in the range 1 to 18 and preferably values in the range 2 to 4, or an alkylene oxide or polyalkylene oxide containing the unit $(—R_5—O)_r$ in which $R_5$ is an alkylene group from $C_1$ to $C_4$ where r can assume values in the range 1 to 30 and preferably in the range 1 to 10, or, lastly, a combination of the two units, such as $(—R_5—O)_5—(CH_2)_q$ and the radical $R_6$ is either hydrogen or alkyls and alkyl sulphonic acids ranging from $C_1$ to $C_{18}$.

The concentration of the ethylenic acid unit is between 0% and 90% by weight based on the composition of the terpolymer.

The concentration of the acrylamide unit is between 0% and 90% by weight based on the composition of the terpolymer.

The concentration of the phosphoric acid ethylenic ester unit is between 2% and 60%.

The preparation of the copolymer requires the presence of the necessary monomers consistent with the abovementioned units.

The first monomer, which is an ethylenic acid, is preferably chosen from the group of acrylic and/or methacrylic, itaconic, crotonic, aconitic, fumaric, mesaconic, sinapic, undecylenic, angelic, and hydroxyacrylic acids and maleic anhydride.

The second monomer, which is an acrylamide, is preferably chosen from the group consisting of acrylamide, methacrylamide, and acrylamidoalkylsulphonic acids, such as 2-acrylamido-2-methylpropanesulphonic acid.

The third monomer, which is an ethylenic ester of phosphoric acid, is prepared, for example, by reaction of phosphoric acid and/or anhydride with an ethylenic alcohol, in which the ethylenic alcohol may be the monomethacrylate or the monoacrylate of ethylene glycol, propylene glycol, polyglycol, allyl alcohol or their mixture. This monomer is a polymerizable and/or copolymerizable ethylenic ester of phosphoric acid. The setting-retarder adjuvant which preserves and/or improves the rheological properties of the hydraulic cement compositions is the result of copolymerization in the presence of initiators and regulators which are well known to the person skilled in the use of the monomers, according to known processes, in an aqueous, alcoholic, hydroalcoholic, aromatic or aliphatic medium, leading to a copolymer of a molecular mass which is generally between 500 and 50,000.

Thus, the polymerization medium may be water, methanol, ethanol, propanol, isopropanol, butanols, dimethylformamide, dimethyl sulphoxide, tetrahydrofuran, acetone, methyl ethyl ketone, ethyl acetate, butyl acetate, hexane, heptane, benzene, toluene, xylene, mercaptoethanol, tertdodecyl mercaptan, thioglycolic esters, n-dodecyl mercaptan, acetic, tartaric lactic, citric, gluconic and glucoheptonic acids, 2-mercaptopropionic acid, thiodiethanol, carbon tetrachloride, chloroform, methylene chloride, methyl chloride, and monopropylene glycol or ethylene glycol esters and/or ethers, etc.

Immediately on completion of the polymerization the solution of the polymerizate obtained may be partly or totally neutralized, by means of at least one neutralization agent chosen from the group of oxides and/or hydroxides of suitable monovalent and/or divalent and/or trivalent metals, such as lithium, sodium, potassium, ammonium, calcium, magnesium, zinc, iron, chromium or aluminium hydroxides, or else with a primary, secondary or tertiary, aliphatic and/or cyclic amine such as for example, ethanolamines (mono-, di-, triethanolamine) mono- and diethylamine, cyclohexylamine, methylcyclohexylamine etc.

The aqueous phase containing the terpolymer may be employed in this form as a setting-retardant which preserves and/or improves the rheological properties of the hydraulic cement compositions, but it may also be processed, by any known means, to remove the aqueous phase and isolate the copolymer in the form of a fine powder which may be employed as an adjuvant in this alternative form.

The specific viscosity of the setting-retarder adjuvant for the hydraulic cement composition according to the invention is generally between 0.3 and 2.0 and preferably between 0.4 and 1.0.

This specific viscosity of the retardant adjuvant, which is expressed by the letter "$\eta_{spe}$" is determined as follows:

A solution of acrylic polymer and/or copolymer, 100% neutralized (degree of neutralization=1) with sodium hydroxide for the measurement, is prepared by dissolving 50 g of dry polymer and/or copolymer in a liter of a solution of distilled water containing 60 g of NaCl. The flow time of a given volume of the above-mentioned solution containing the alkaline acrylic polymer and/or copolymer, and the flow time of the same volume of an aqueous sodium chloride solution devoid of the said polymer and/or copolymer, are then measured with a capillary viscometer having a Baume constant of 0.000105, placed in a bath thermostated at 25° C. The viscosity "$\eta_{spe}$" can then be defined by virtue of the following relationship:

$$\eta_{spe} = \frac{\text{(flow time of the polymer solution)} - \text{(flow time of the NaCl solution)}}{\text{flow time of the NaCl solution}}$$

The capillary tubing is generally chosen so that the flow time of the NaCl solution devoid of polymer and/or copolymer is approximately 90 to 100 seconds, thus giving specific viscosity measurements with very good accuracy.

The preparation of the hydraulic cement composition with delayed setting is carried out according to the "Specifications of American Petroleum Institute (API-)—(Spec 10 First Edition, January 1982) for Materials and Testing for Well Cements", section 5, pages 16 and 17, taking account of the classification of the cement employed, the setting-retarder adjuvant being dissolved in the liquid phase before being introduced into the hydraulic cement employed.

EXAMPLE 1

This example illustrates a method of preparing setting retarder adjuvants preserving and/or improving the rheological properties of cement compositions according to the invention, by copolymerization, according to a known type, or acrylic acid and/or acrylamide with ethylene glycol methacrylate phosphate.

To prepare the polymer identified as (A), the following ingredients were placed in the bottom of a vessel:
Water: 778 kg
Isopropanol: 968 kg
$FeSO_4.7H_2O$: 1.24 kg
Hydroxylamine sulphate: 2.27 kg
100% $H_2SO_4$: 0.96 kg The mixture thus produced was heated to a temperature of 80° C.

A charge consisting of
$H_2O$: 798 kg
90% acrylic acid: 1730 kg
Ethylene glycol methacrylate phosphate: 389 kg
Hydroxylamine sulphate: 25 kg
was then added over a period of approximately three hours while this temperature was maintained at 80° C.

A polymerization catalyst consisting of:
120-volume $H_2O_2$: 109 liters
$H_2O$: 389 liters
was added at the same time as the said charge.

After the addition of the catalyst and of the charge, distillation was carried out at a temperature of 100° C., with the aim of removing all the isopropylalcohol.

After the resulting mixture had been cooled to 20° C. it was neutralized with a 50% NaOH solution to a pH of approximately 8.

Finally, the solution containing the polymer was adjusted to a final solids concentration of 41.0%.

Using the same method of polymerization, five other copolymers, identified as (B) to (F), were also prepared as adjuvants according to the invention, together with both a polymer and a copolymer, which are identified as (G) and (H), adjuvants according to the prior art, the compositions of which are expressed in percent by weight, based on the polymer composition, of each of the acrylic acid, acrylamide and ethylene glycol methacrylate phosphate units. The specific viscosities are collated in Table I below:

TABLE I

| Copolymer or polymer adjuvant | A | B | C | D | E | F | G | H |
|---|---|---|---|---|---|---|---|---|
| Acrylic acid | 80 | 49 | 20 | 63 |  | 42 | 70 | 100 |
| Acrylamide | 0 | 32 | 60 | 27 |  | 18 | 30 | 0 |
| Ethylene glycol methacrylate phosphate | 20 | 19 | 20 | 10 | 30 | 40 | 0 | 0 |
| Spec. viscosity | 0.55 | 0.52 | 0.66 | 0.62 | 0.94 | 0.49 | 0.45 | 0.5 |

EXAMPLE 2

This example illustrates the effectiveness of the hydraulic cement composition with delayed setting according to the invention, employed under high temperature conditions and comprising an aqueous liquid phase consisting of natural fresh water of a hardness of 30°TH (French), an API class G hydraulic cement and the setting-retarder adjuvant preserving and/or improving the rheological properties.

For this purpose, this example consists of a series of tests carried out using hydraulic cement compositions prepared in accordance with section 5, pages 16 and 17 of the API specifications, each test composition containing an adjuvant according to the invention or according to the prior art, which was dissolved in water beforehand.

The cement used was "Blue Circle", class G-HSR, marketed by Blue Circle Industries P.L.C., belonging to class G as defined in API specifications, section 2, page 8, table 2-1.

Test 1 concerned a control hydraulic cement composition, that is to say free from setting-retarder adjuvant.

Tests 2, 3, 4 and 6 concerned hydraulic cement compositions containing a setting-retarder adjuvant belonging to the prior art.

The adjuvant involved in the cement composition of test no. 2 was a lignosulphonate-based product known to the specialist and marketed under the name of "Liquid Retarder for Cement" D81 by Dowell Schlumberger.

The adjuvant involved in the cement composition of test no. 3 was a polymer of acrylic acid on its own, with a specific viscosity of 0.5.

The adjuvant involved in the cement composition in test no. 4 was a product known to the specialist and marketed under the name of "High Temperature Retarder" D28 by Dowell Schlumberger. This adjuvant of the prior art was dissolved beforehand at a concentration of 41% by weight in fresh water to adjust it to an active substance concentration similar to that of the adjuvant according to the invention.

The adjuvant involved in the cement composition of test no. 6 was a 70/30 copolymer of acrylic acid and acrylamide.

Tests 5, 7, 8, 9 and 10 concerned the hydraulic cement compositions containing a setting-retarder adjuvant forming part of the invention, the compositions and characteristics of which were given in Table I. Each cement composition had a relative density of 1.90.

The following measurements were made for each hydraulic cement composition subjected to a test:
measurements of pumpability times, in accordance with API specifications, section 8, pages 22 to 31, and with "Appendix F", pages 52 to 71, the measurement being expressed in minutes, the pumpability time being measured at the following temperatures:

52° C. (125° F.) schedule 5—Table P3, page 30
120° C. (248° F.) schedule 9—Table P3, page 31
132° C. (270° F.) schedule 9g(6)—Table E6, page 56
150° C. (302° F.) schedule 9g(7)—Table E6, page 56
176° C. (348° F.) schedule 11g(6)—Table E6, page 58 rheological measurements, carried out in accordance with API specifications, Appendix H, page 77 at temperatures of 27° C. (80° F.).

The following were determined in this manner: the apparent viscosity (AV), expressed in centipoises, plastic viscosity (PV) in centipoises, the yield value (YV), expressed in pounds per hundred square feet, the gel at zero time ($G_0$) and the gel at 10 minutes ($G_{10}$) which are also expressed in pounds per hundred square feet. All these measurements, well known to the specialist, are also described in the work "Manual de rhéologie des fluides de forage et laitiers de ciment", édition Technip 1979.

Free water determination ("determination of free water content of slurry") as described in the API specifications, section 6, page 18, expressed in milliliters of water.

Finally, the determination of the compressive strength ("operating strength tests"), API specifications, Appendix D1, pages 49 to 51, Table D1, schedule 6 Sg-8. (121° C. or 250° F. after 24 hours).

All the results are given in the Tables II and III below.

TABLE II

| Tests No. | Setting retarder adjuvant Type | ml/100 g of cement | Setting time in minutes at a temperature of 52° C. | 120° C. | 132° C. | 150° C. | free water in ml | Compressive strength in bars |
|---|---|---|---|---|---|---|---|---|
| Test 1 | 0 | 0 | 108 | 46 | 42 | | 0,5 | 381 |
| Test 2a | Prior | 0,18 | 107 | 52 | measurements | | | |
| Test 2b | Art I | 0,53 | 180 | 55 | impossible | | | |
| Test 2c | | 0,90 | 214 | 60 | | | 0 | |
| Test 3a | Prior | 0,18 | | | No measurement because rheology too high | | | |
| Test 3b | Art H | 0,53 | | | | | | |
| Test 3c | | 0,90 | | | | | | |
| Test 4a | Prior | 0,18 | | 63 | 55 | | | |
| Test 4b | Art J | 0,53 | | 96 | 64 | | | 442 |
| Test 4c | | 0,70 | | 261 | | | | |
| Test 4d | | 0,90 | >400 | >400 | 67 | 55 | 5,9 | |
| Test 4e | | 1,32 | | | 176 | | | |
| Test 5a | Inven- | 0,18 | | | | | | |
| Test 5b | tion A | 0,90 | 0,53 | | | | | |
| Test 5c | | 0,90 | | | | | | |
| Test 6a | Prior | 0,53 | | | | | | |
| Test 6b | Art G | 0,90 | | | | | | |
| Test 6c | | 1,32 | | | 166 | 0 | | |
| Test 7a | Inven- | 0,18 | 123 | 60 | 65 | | | 363 |
| Test 7b | tion B | 0,53 | 230 | 187 | 112 | | | |
| Test 7c | | 0,90 | >400 | >400 | 150 | 96 | 2,6 | |
| Test 7d | | 1,32 | | | 223 | | | |
| Test 8a | Inven- | 0,90 | | | | | | |
| Test 8b | tion D | 1,32 | | | 169 | | 1,6 | |
| Test 9a | Inven- | 0,53 | | | | | | |

TABLE II-continued

| Tests No. | Setting retarder adjuvant Type | ml/100 g of cement | Setting time in minutes at a temperature of 52° C. | 120° C. | 132° C. | 150° C. | free water in ml | Compressive strength in bars |
|---|---|---|---|---|---|---|---|---|
| Test 9b | tion E | 0,90 | | | | | | |
| Test 9c | | 1,32 | | | 160 | | | |
| Test 10a | Inven- | 0,53 | | | | | | |
| Test 10b | tion F | 0,90 | | | | | | |
| Test 10c | | 1,32 | | | 156 | | | |

TABLE III

| Test No. | Adjuvant Type | ml/100 g of cement | Rheology at 27° C. (80° F.) AV | PV | YV | $G_0$ | $G_{10}$ |
|---|---|---|---|---|---|---|---|
| Test 1 | 0 | 0 | 47,5 | 19 | 57 | 17 | 21 |
| Test 2a | Prior | 0,18 | 65 | 22 | 86 | 29 | 31 |
| Test 2b | Art I | 0,53 | 68 | 26 | 84 | 23 | 28 |
| Test 2c | | 0,90 | 49 | 25 | 48 | 19 | 36 |
| Test 3a | Prior | 0,18 | 48 | 29 | 38 | 15 | 19 |
| Test 3b | Art H | 0,53 | 93 | 66 | 54 | 25 | 67 |
| Test 3c | | 0,90 | | | | Off scale | |
| Test 4a | Prior | 0,18 | 54,5 | 23 | 63 | 19 | 26 |
| Test 4b | Art J | 0,53 | 26,5 | 20 | 13 | 8 | 18 |
| Test 4c | | 0,90 | 22 | 20 | 4 | 6 | 15 |
| Test 5a | Inven- | 0,18 | 43 | 23 | 40 | 16 | 25 |
| Test 5b | tion A | 0,53 | 47,5 | 24 | 47 | 18 | 29 |
| Test 5c | | 0,90 | 55 | 36 | 38 | 20 | 39 |
| Test 6a | Prior | 0,53 | 50 | 35 | 30 | 14 | 50 |
| Test 6b | Art G | 0,90 | 47 | 31 | 32 | 15 | 128 |
| Test 6c | | 1,32 | 42 | 28 | 28 | 20 | >300 |
| Test 7a | Inven- | 0,18 | 37,5 | 25 | 25 | 13 | 17 |
| Test 7b | tion B | 0,53 | 49,5 | 31 | 37 | 17 | 32 |
| Test 7c | | 0,90 | 48 | 27 | 42 | 21 | 42 |
| Test 7d | | 1,32 | 58 | 40 | 36 | 15 | 44 |
| Test 8a | Inven- | 0,90 | 54 | 32 | 44 | 21 | 54 |
| Test 8b | tion D | 1,32 | 46 | 25 | 42 | 27 | 165 |
| Test 9a | Inven- | 0,53 | 42 | 26 | 32 | 16 | 34 |
| Test 9b | tion E | 0,90 | 44,5 | 27 | 35 | 16 | 33 |
| Test 9c | | 1,32 | 50 | 26 | 48 | 20 | 62 |
| Test 10a | Inven- | 0,53 | 39 | 25 | 28 | 15 | 28 |
| Test 10b | tion F | 0,90 | 44 | 26 | 36 | 18 | 41 |
| Test 10c | | 1,32 | 38,5 | 23 | 31 | 19 | 76 |

Thus, Tables II and III show that the cement compositions containing the adjuvant according to the invention make it possible to obtain the longest pumpability times even at the highest temperatures without destroying the other characteristics, which are: free water, compressive strength and, above all, the rheology. In some case, the setting-retarder adjuvants according to the invention even have an effect which tends to reduce the yield value of the cement composition, while the setting-retarder adjuvants devoid of ethylenic esters of phosphoric acid produce large increases in viscosity or in gels ($G_{10}$) rendering the said cement composition unpumpable.

EXAMPLE 3

This example illustrates the effective nature of the hydraulic cement composition with delayed setting according to the invention, employed for cementing offshore oil boreholes and comprising a liquid phase (mixing water) consisting of seawater (taken from the Mediterranean).

For this purpose, a series of tests was carried out using cement compositions prepared according to the API specifications, as in Example 2. The cement employed was "Blue Circle" class G-HSR, as in Example 2.

Test 11 concerned a control hydraulic cement composition, that is to say containing no adjuvant.

Tests 12 concerned hydraulic cement compositions containing a setting-retarder adjuvant forming part of the prior art, which was a "High Temperature Retarder" D28, previously dissolved in water at a concentration of 41%.

Tests 13 concerned hydraulic cement compositions containing the setting-retarder adjuvant (B) according to the invention, the compositions and characteristics of which are given in Table I.

Tests 14 concerned hydraulic cement compositions containing the setting-retarder adjuvant (C) according to the invention, the compositions and characteristics of which are given in Table I.

The setting-retarder adjuvant of each cement composition, whether forming part of the prior art or of the invention, was dissolved beforehand in the water intended for the mixing.

The relative density of the cement compositions prepared in this manner was 1.92.

Each cement composition was subjected to measurements of pumpability time, rheology, free water determination and compressive strength.

All these measurements were carried out in accordance with the API specifications referred to in Example no. 2.

All the results are given in Tables IV and V below.

TABLE IV

| Tests No. | Retardant Adjuvant Type | ml/100 g of cement | Setting time in minutes at 120° C. | Free water in ml | Compressive strength in bars |
|---|---|---|---|---|---|
| Test 11 | 0 control | 0 | 32 | 0 | 358 |
| Test 12a | Prior | 0.53 | 80 | 1.5 | |
| Test 12b | Art J | 0.90 | 102 | 3 | |
| Test 12c | | 1.32 | 171 | 3.2 | 450 |
| Test 12d | | 1.54 | 260 | 3.2 | |
| Test 13a | Inven- | 0.53 | 116 | 0 | |
| Test 13b | tion | 0.90 | 133 | 0.5 | |
| Test 13c | B | 1.32 | 277 | 0 | 456 |
| Test 13d | | 1.54 | | 0.9 | 412 |
| Test 14 | Inven- tion C | 0.90 | 172 | 0.5 | |

TABLE V

| Test No. | Adjuvant Type | ml/100 g of cement | Rheology at 27° C. (80° F.) AV | PV | YV | $G_0$ | $G_{10}$ |
|---|---|---|---|---|---|---|---|
| Test 11 | Control 0 | 0 | 53 | 22 | 62 | 20 | 33 |
| Test 12a | Prior | 0.53 | 48 | 26 | 44 | 16 | 20 |
| Test 12b | Art J | 0.90 | 42 | 26 | 32 | 15 | 19 |
| Test 13a | Inven- | 0.53 | 46.5 | 28 | 37 | 17 | 28 |
| Test 13b | tion B | 0.90 | 70 | 32 | 76 | 32 | 59 |
| Test 14 | Inven- tion C | 0.90 | 52 | 25 | 54 | 19 | 29 |

Tables IV and V reveal that the cement compositions containing the adjuvant according to the invention and in which the aqueous phase is seawater have excellent pumpability and free water characteristics, and excellent compressive strength at 121° C. (250° F.) after 24 hours, together with good rheological properties. All these properties are practically unchanged by the presence of the saline aqueous phase, as can be seen from the comparison of Tables IV and V with Tables II and III, mentioned earlier.

EXAMPLE 4

Since it is frequently necessary to plasticize hydraulic cement compositions by adding a plasticizing agent to facilitate their use in boreholes, the aim of this example is to demonstrate the compatibility of the setting-retarder adjuvants according to the invention with traditional plasticizing adjuvants which are well known to the specialist, this compatibility being essential to enable each specific adjuvant to play its part at least as efficiently as if it were alone in the hydraulic cement compositions, this efficiency needing to be displayed with any cement belonging to the same class in the API specifications.

To this end, various tests have been carried out using cement compositions, containing both a plasticizing agent well known to the specialist, such as calcium polynaphthalenesulphonate (solution containing 41% by weight of active matter) and a setting-retarder agent, copolymer "C" the composition of which is defined in the abovementioned Table I.

Each cement composition prepared according to the API specifications as in Example 2, consequently contained an aqueous liquid phase consisting of natural fresh water, of a hardness of 30°TH (French), an API hydraulic cement belonging to class G, the setting-retarder adjuvant according to the invention and the abovementioned plasticizing agent.

Tests 15 were carried out with the use of "Blue Circle" class G-HSR cement.

Tests 16 employed a G CEM cement marketed by the cement company "Origny", France, belonging to class G-HSR.

Tests 17 employed a "Dyckerhoff" cement belonging to the same class.

The tests indicated by the letter "a" concerned control hydraulic cement compositions, that is to say devoid of any adjuvant.

The tests indicated by the letter "b" concerned cement compositions containing the setting-retarder adjuvant, but devoid of any plasticizing agent.

The tests indicated by the letter "c" concerned cement compositions containing a plasticizing agent but devoid of the setting retardent according to the invention.

Finally, the tests indicated by the letter "d" concerned cement compositions which simultaneously contained the setting retardent according to the invention and the plasticizing agent.

The relative density of the cement compositions prepared in this manner was 1.90.

Each cement composition was subjected to measurements of the rheological properties in accordance with the API specifications referred to in Example 2.

All the results are shown in Table VI below:

TABLE VI

| Test No. | Type of cement | Setting-retarder Adjuvant. Copolymer C in ml/100 g of cement | 41% plasticizing adjuvant in ml/100 g of cement | Rheology at 27° C. (80° F.) | | | | |
|---|---|---|---|---|---|---|---|---|
| | | | | AV | PV | YV | $G_0$ | $G_{10}$ |
| Test 15a | Blue Circle | 0 | 0 | 51 | 23 | 56 | 26 | 29 |
| Test 15b | Class G-HSR | 0,53 | 0 | 48 | 32 | 32 | 14 | 31 |
| Test 15c | | 0 | 0,53 | 39 | 18 | 42 | 23 | 25 |
| Test 15d | | 0,53 | 0,53 | 39 | 27 | 24 | 17 | 32 |
| Test 16a | G-CEM | 0 | 0 | 57 | 32 | 50 | 17 | 27 |
| Test 16b | Class G-HSR | 0,53 | 0 | 64 | 47 | 34 | 15 | 33 |
| Test 16c | | 0 | 0,53 | 50 | 28 | 44 | 22 | 34 |
| Test 16d | | 0,53 | 0,53 | 33 | 30 | 6 | 7 | 28 |
| Test 17a | Dyckehoff | 0 | 0 | 52 | 28 | 48 | 22 | 29 |
| Test 17b | Class G-HSR | 0,53 | 0 | 41 | 39 | 4 | 10 | 18 |
| Test 17c | Red label | 0 | 0,53 | 24 | 24 | 0 | 2 | 8 |
| Test 17d | | 0,53 | 0,53 | 26 | 26 | 0 | 1 | 1 |

Thus, Table VI reveals that the rheological properties, especially the yield value, of the cement compositions have already been markedly improved by the addition of the setting-retarder additive according to the invention; this improvement is enhanced further by the addition of a specific plasticizer which reveals actual synergism between the two adjuvants.

EXAMPLE 5

When an oil or other well is being drilled, it frequently happens that the drilling bit passes through a geological stratum of natural salt; the hydraulic cement compositions with delayed setting, based on fresh water or seawater and employed in such wells may be quickly altered "in situ", with consequent and inconvenient changes in their behaviour.

To this end, with this in mind various tests were carried out, starting with cement compositions prepared according to the API specifications (referred to in Example 2), in which the freshwater aqueous phase was replaced by a solution saturated with sodium chloride (320 g/l). The cements employed in the preparation of the cement compositions were chosen from the class GHSR in the API specifications.

The relative density of the cement compositions was 1.96.

In a first group of tests, the cement employed in the preparation of the cement compositions was "Blue Circle" G-HSR, belonging to class G in the API specifications.

Test 18 concerned a control hydraulic cement composition, that is to say devoid of setting-retarder adjuvant.

Test 19 concerned hydraulic cement compositions containing the setting-retarder adjuvant "B" according to the invention, the composition and properties of which have been defined in Table I.

Tests 20 concerned hydraulic cement compositions containing a setting-retarder adjuvant "J" forming part of the prior art, which was marketed by Dowell Schlumberger under the name of "High Temperature Retarder D28" an aduvant which is recommended to withstand temperatures of between 93° C. and 204° C. (200° F. and 400° F.) and dissolved beforehand in fresh water at a solids concentration of 41% by weight.

Each cement composition was subjected to measurements of pumpability time and a determination of free water.

All these measurements were carried out in accordance with the API specifications referred to in Example 2.

The results related to these tests are shown in Table VII below.

TABLE VII

| Tests No. | Retardant Adjuvant Type | ml/100 g of cement | Setting time in minutes at 120° C. | 150° C. | 176° C. | Free water ml |
|---|---|---|---|---|---|---|
| Test 18 | 0 | 0 | 57 | | | 0,5 |
| Test 19a | | 0,53 | 225 | | | 0,8 |
| Test 19b | B | 0,90 | >400 | 290 | 115 | 1,5 |
| Test 19c | | 1,80 | >400 | >400 | 204 | 1,7 |
| Test 20a | | 0,53 | 80 | | | 1,0 |
| Test 20b | | 0,90 | 143 | | | 1.6 |
| Test 20c | J | 1,80 | >400 | 283 | 83 | 6.0 |

This Table shows that the cement compositions containing the adjuvant according to the invention and in which the aqueous phase is saturated brine have excellent pumpability and free water characteristics which appear clearly superior, even at a low concentration, to the characteristics obtained for cement compositions forming part of the prior art (tests 20) in which the setting-retarder adjuvant is well known to the specialist for its ability to control the pumpability times of the cement compositions when they are subjected to relatively high well-bottom temperatures.

In a second group of tests the cement employed in the preparation of the cement composition was again "Blue Circle G-HSR", but the setting-retarder adjuvant according to the invention was included in the form of three different compositions in order to examine the effect of the saturated brine hydraulic phase on the rheological properties of the said cement compositions.

Test 21 concerned a control hydraulic cement composition, that is to say devoid of setting-retarder adjuvant.

Test 22 concerned a hydraulic cement composition containing the setting-retarder adjuvant (A) according to the invention, the composition and the characteristics of which have been defined in Table 1.

Test 23 concerned a hydraulic cement composition containing the setting-retarder adjuvant (B) according to the invention (Table I).

Test 24 involved a hydraulic cement composition containing the setting-retarder adjuvant (C) according to the invention (Table 1).

All these cement compositions were subjected to measurements of rheological properties in accordance with the API specifications referred to in Example 2.

The various results concerning these tests are shown in Table VIII below:

TABLE VIII

| Test No. | Setting-retarder adjuvant Type | ml/100 g of cement | Rheology at 27° C. (80° F.) | | | | |
|---|---|---|---|---|---|---|---|
| | | | AV | PV | YV | $G_0$ | $G_{10}$ |
| Test 21 | 0 | 0 | 45 | 32 | 26 | 16 | 23 |
| Test 22 | Copolymer (A) | 0.53 | 38 | 33 | 10 | 7 | 14 |
| Test 23 | Copolymer (B) | 0.53 | 30 | 25 | 10 | 8 | 29 |
| Test 24 | Copolymer (C) | 0.53 | 25 | 22 | 6 | 8 | 28 |

Thus, the adjuvants according to the invention reveal themselves to be effective for controlling the rheology of the hydraulic cement compositions with delayed setting, and, in particular, greatly reducing the yield value and the gels at time 0 and 10 of the said compositions, without it being necessary to add a specific plasticizing adjuvant.

To check the behaviour with other cements, similar tests were carried out starting with hydraulic cement compositions incorporating one of the setting-retarder adjuvants (A), (B) or (C). (Table IX).

Test 25 concerned a control hydraulic cement composition containing no setting-retarder adjuvant. (Cement G CEM from Origny, belonging to class G-HSR).

Tests 26 to 28 concerned hydraulic cement compositions according to the invention, in which the cement employed was the Origny cement belonging to class G-HSR.

Test 29 concerned a control hydraulic cement composition containing no setting retarder adjuvant. (Dyckerhoff class G-HSR cement).

Tests 30, 31 and 32 also concerned hydraulic cement compositions according to the invention, in which the cement employed was the Dyckerhoff cement belonging to class G-HSR.

All these cement compositions were subjected to measurements of rheological properties in accordance with the API specifications referred to in example 2.

The various results concerning these tests are collated in Table IX below:

TABLE IX

| Tests No. | Setting-retarder adjuvant Type | ml/100 g | Cement Type | Rheology at 27° C. (80° F.) | | | | |
|---|---|---|---|---|---|---|---|---|
| | | | | AV | PV | YV | $G_0$ | $G_{10}$ |
| Test 25 | 0 | 0 | | 51 | 38 | 26 | 15 | 23 |
| Test 26 | Copolymer A | 0,53 | G-CEM | 40 | 36 | 8 | 5 | 9 |
| Test 27 | Copolymer B | 0,53 | Origny | 31 | 29 | 4 | 5 | 28 |
| Test 28 | Copolymer C | 0,53 | | 28 | 25 | 6 | 5 | 20 |
| Test 29 | 0 | 0 | | 47 | 40 | 14 | 10 | 17 |
| Test 30 | Copolymer A | 0,53 | Dyckerhoff | 31 | 29 | 4 | 6 | 16 |
| Test 31 | Copolymer B | 0,53 | | 31 | 31 | 0 | 2 | 4 |
| Test 32 | Copolymer C | 0,53 | | 29 | 29 | 0 | 3 | 14 |

As a result, according to Table IX, it can be confirmed that the adjuvants according to the invention reveal themselves to be highly effective for controlling the rheology of the hydraulic cement compositions with delayed setting, in which the aqueous phase is saturated brine, whatever the cement which is employed and which belongs to the class G-HSR as defined in the API specifications. It can also be confirmed that these adjuvants have a specific effect on the yield value, which they reduce markedly, thus demonstrating a plasticizing effectiveness.

EXAMPLE 6

This example illustrates the plasticizing and water-reducing character of the setting-retarder adjuvants according to the invention in cement compositions based on fresh water and cement and employed in the Civil Engineering and construction field.

To this end, a series of tests was carried out, using hydraulic cement compositions, by mixing in a suitable device, described in French Standard NF P 15,411:

natural fresh water, of a hardness of 30°TH (French), in which the adjuvant according to the invention was dissolved beforehand, 1 kg of Vicat CPA 55 cement conforming to French Standard NF P 15,301.

These cement compositions were then subjected to a determination of the paste consistency, using, as reference, French Standard NF P 15,402, which defines the normal consistency of "pure paste" containing solely water and cement.

In practice, a determination was carried out by successive trial and error of the quantity of water to be added to produce a "normal consistency", that is to say a pure paste which, when placed in a frustoconical mould and under the Vicat apparatus, holds up the lower end of a consistency probe acting under it own weight at a distance of 6±1 millimeters from the bottom of the mould.

Test 33 concerned the preparation of a pure paste, of normal consistency and free from any additive.

Tests 34 concerned the preparation of pure pastes of normal consistency, with reduced water and receiving various concentrations of an adjuvant according to the invention (copolymer B described in Table I), which were expressed in percent by weight based on the cement present.

Test 35 involved the preparation of a paste of normal consistency with reduced water and receiving 0.8% by weight, based on the cement present, of a plasticizer in common use, based on calcium polynaphthalenesulphonate.

All the results related to the measurements of percentage of water conferring normal consistency to the cement compositions, and to water reduction, are combined in Table X below.

TABLE X

| No. of Tests | Plasticizer | Weight % of plasticizing adjuvant, based on the cement | % of water giving normal consistency | Reduction in % |
|---|---|---|---|---|
| Test 33 | 0 | 0 | 26,5 | 0 |
| Test 34a | | 0,2 | 24,9 | 5 |
| Test 34b | | 0,4 | 24,1 | 9 |
| Test 34c | Copolymer B | 0,6 | 24,0 | 9,4 |
| Test 34d | | 1 | 24,3 | 8,3 |
| Test 35 | Calcium poly-naphthalene-sulphonate | 0,8 | 25,2 | 4,9 |

All these results clearly demonstrate the effectiveness of the adjuvant according to the invention as a plasticizing agent for a pure cement composition containing fresh water and Portland cement, thus enabling the quantity of water required for mixing to be reduced.

We claim:

1. A hydraulic cement composition, comprising:
   (a) an aqueous liquid phase,
   (b) at least one hydraulic cement,
   (c) a setting-retarder adjuvant preserving or improving rheological properties, comprising a water-soluble polymer obtained from the copolymerization of $CH_2=CR_1-COOH$ or maleic anhydride with $CH_2=CR_2-CONHR_6$ and $CH_2=CR_4-COO-R_3-OPO_3H_2$, wherein $R_1$, $R_2$ and $R_4$ are each independently chosen from the group consisting of hydrogen and $C_1-C_{18}$-alkyls, $R_3$ is chosen from the group consisting of alkylenes, alkylene oxides and polyalkylene oxides, and $R_6$ is chosen from the group consisting of hydrogen, alkyls and alkyl sulfonic acids.

2. The hydraulic cement composition of claim 1, wherein the said aqueous liquid phase is saline.

3. The hydraulic cement composition of claim 1, wherein the said aqueous liquid phase is non-saline.

4. The hydraulic cement composition of claim 1, wherein $R_3$ is a group $-(CH_2)_q-$ in which q is from 1 to 18, or $R_3$ is a group $-(R_5-O)_r-$ wherein $R_5$ is a $C_1-C_4$-alkylene and r is from 1 to 30, or $R_3$ is a combination of the groups $-(R_5-O)_r-$ and $-(CH_2)_q-$.

5. The hydraulic cement composition of claim 4, wherein q is 2 to 4.

6. The hydraulic cement composition of claim 5, wherein r is 1 to 10.

7. The hydraulic cement composition of claim 1, wherein $R_6$ is a hydrogen atom, an alkyl group or a $C_1-C_{18}$-alkyl sulfonic acid.

8. The hydraulic cement composition of claim 1, wherein the said water-soluble polymer contains between 0 to 90% of $CH_2=CR_1-COOH$ or maleic anhydride, between 0 to 90% of $CH_2=CR_2-CONHR_6$, and from 2 to 60% of $CH_2=CR_4-COO-R_3-OPO_3H_2$, wherein the percentage values are expressed in percent by weight based on the composition of the said polymer.

9. The hydraulic cement composition of claim 1, wherein $CH_2=CR_1-COOH$ is acrylic acid, methacrylic acid, itaconic acid, crotonic acid, isocrotonic acid, aconitic acid, fumaric acid, mesaconic acid, sinapic acid, undecylenic acid, angelic acid, or a hydroxy-acrylic acid.

10. The hydraulic cement composition of claim 1, wherein $CH_2=CR_2-CONHR_6$ is acrylamide, methacrylamide, or an acrylamidoalkylsulphonic acid.

11. The hydraulic cement composition of claim 10, wherein $CH_2=CR_2-CONHR_6$ is 2-acrylamido-2-methylpropane sulfonic acid.

12. The hydraulic cement composition of claim 1, wherein $CH_2=CR_4-COO-R_3OPO_3H_2$ is obtained (i) by reacting $P_2O_5$ with an ethylenic alcohol, (ii) by reacting phosphoric acid with an ethylenic alcohol, or (iii) by reacting $P_2O_5$ and phosphoric acid with an ethylenic alcohol.

13. The hydraulic cement composition of claim 3, wherein the said ethylenic alcohol is at least one member selected from the group consisting of methacrylates of ethylene glycol, acrylates of ethylene glycol, methacrylates of propylene glycol, acrylates of propylene glycol, methacrylates of polyglycols and acrylates of polyglycols.

14. The hydraulic cement composition of claim 1, wherein $R_1$, $R_2$ or $R_4$ is a hydrogen atom.

15. The hydraulic cement composition of claim 1, wherein $R_1$, $R_2$ or $R_4$ is a $C_1$–$C_{18}$-alkyl group.

16. The hydraulic cement composition of claim 1, wherein the water-soluble polymer is obtained from the copolymerization of maleic anhydride with $CH_2=CR_2-CONHR_6$ and $CH_2=CR_4-COO-R_3-OPO_3H_2$.

* * * * *